Nov. 22, 1938. M. B. TARK 2,137,421
SKIMMING DEVICE FOR SETTLING TANKS
Filed June 13, 1935 5 Sheets-Sheet 1
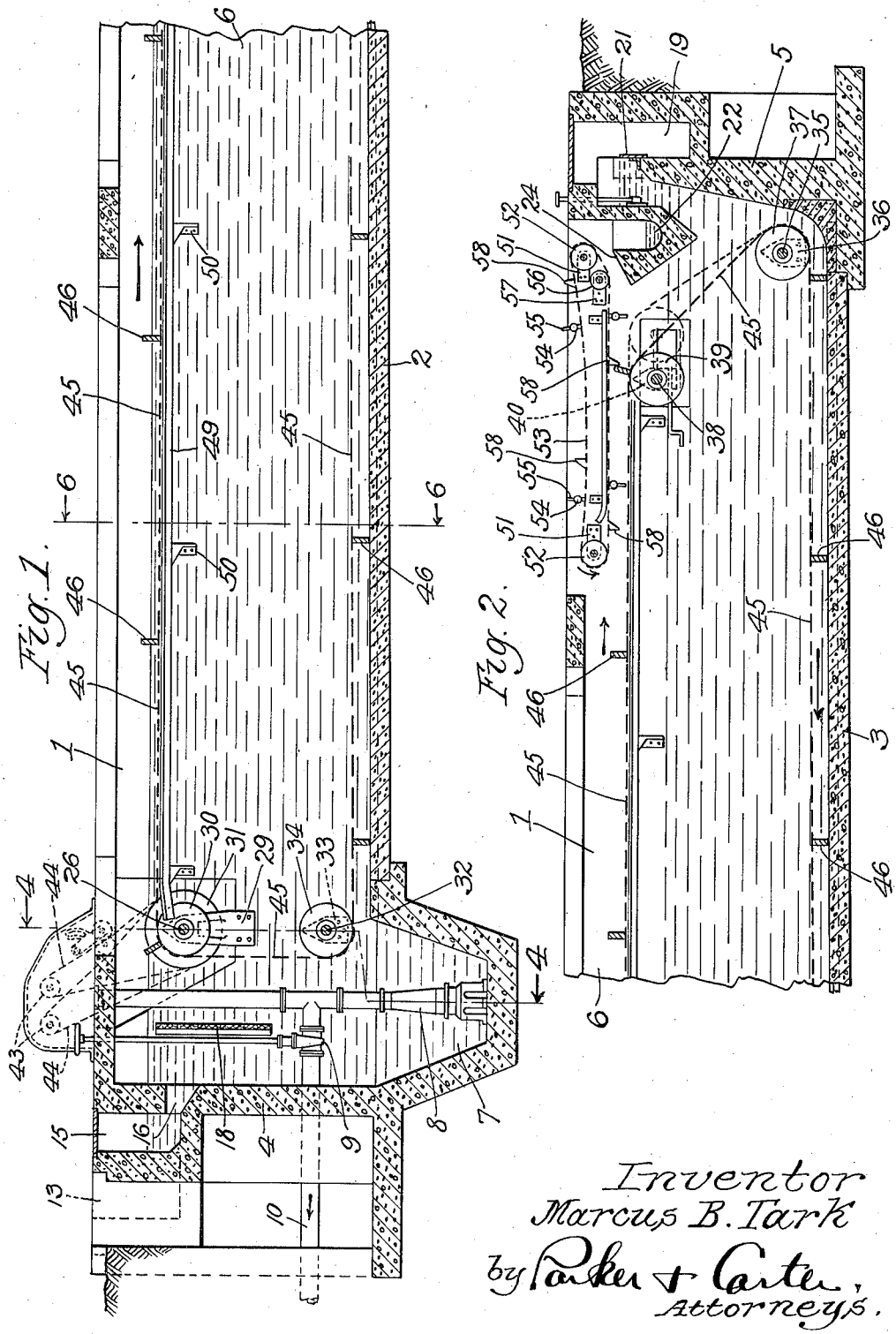
Inventor
Marcus B. Tark
by Parker + Carter,
Attorneys.

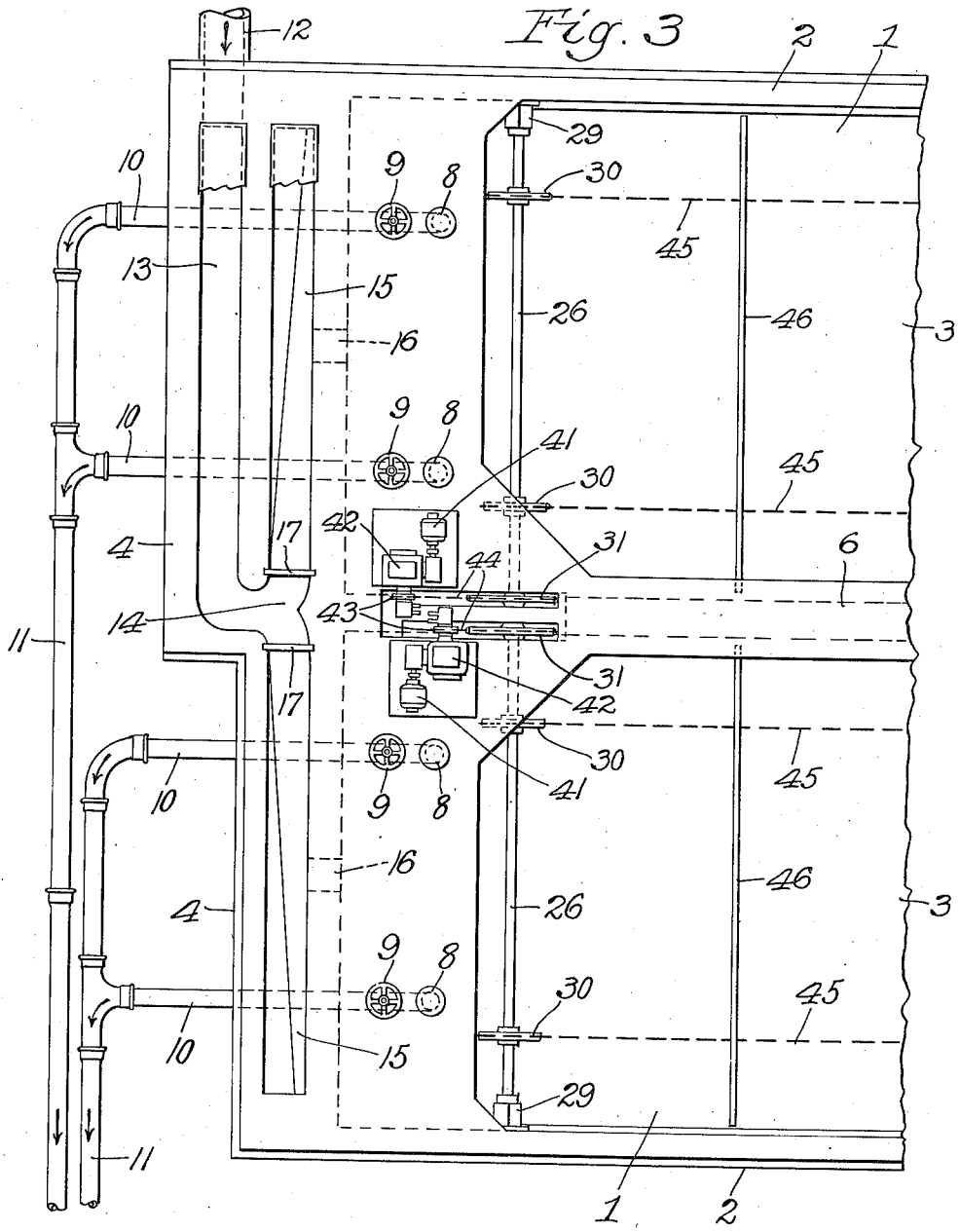

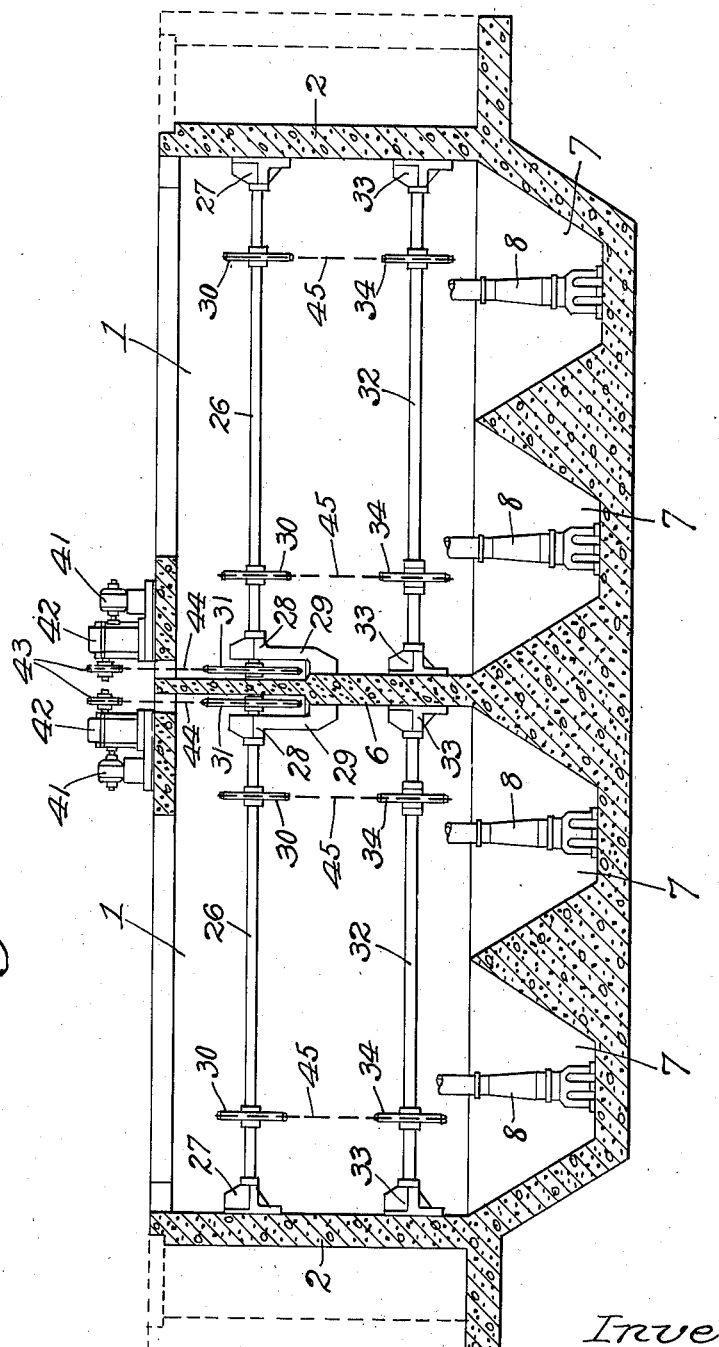

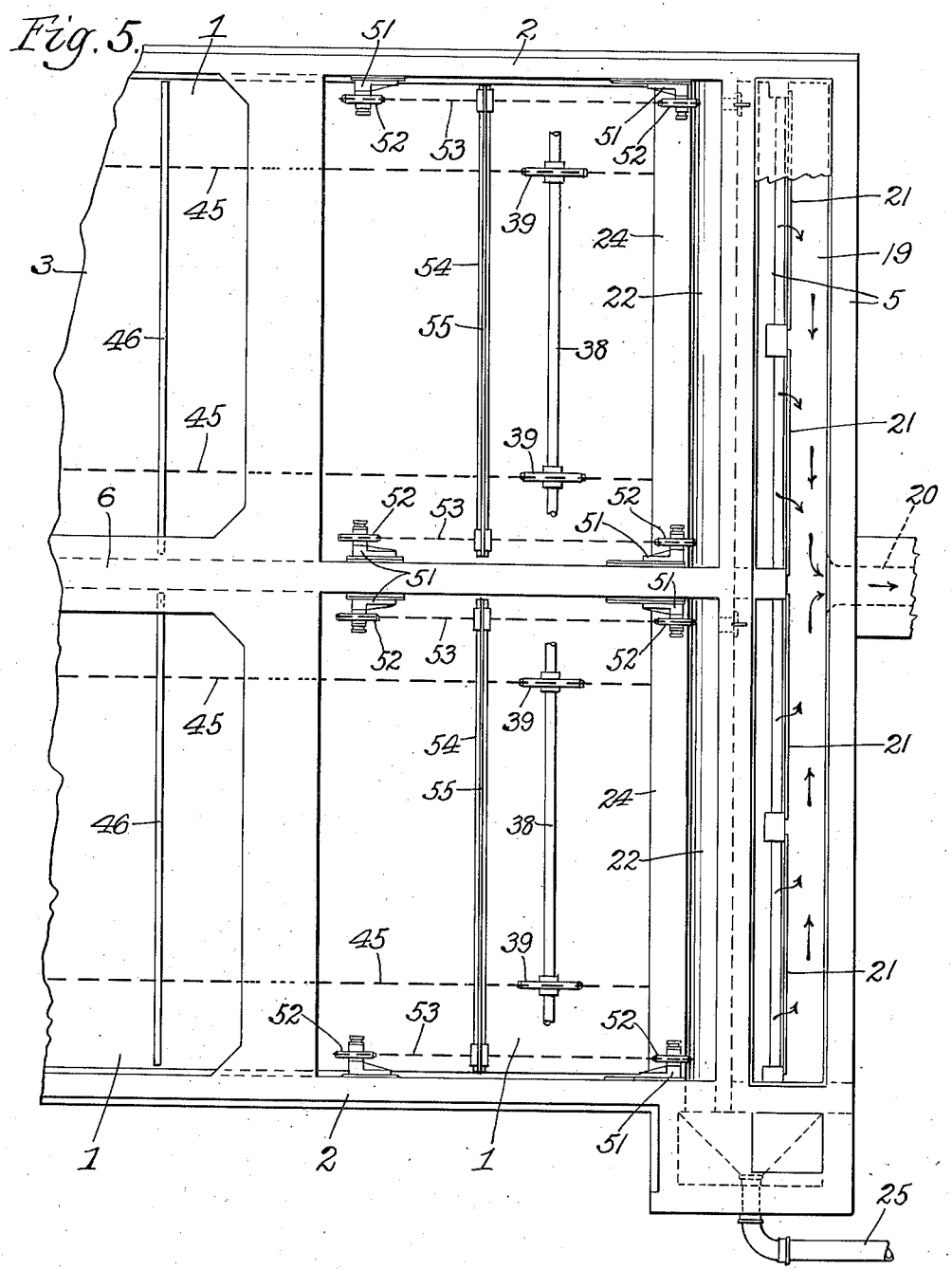

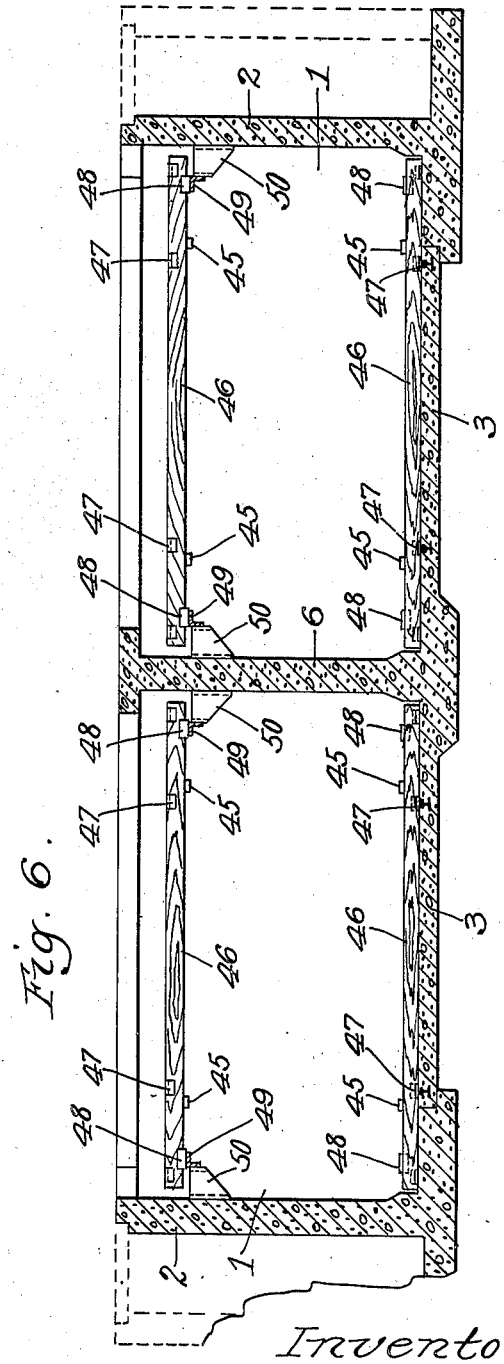

Patented Nov. 22, 1938

2,137,421

UNITED STATES PATENT OFFICE 2,137,421

SKIMMING DEVICE FOR SETTLING TANKS

Marcus B. Tark, Philadelphia, Pa., assignor to Link Belt Company, Chicago, Ill., a corporation of Illinois Application June 13, 1935, Serial No. 26,361

25 Claims. (Cl. 210—3)

This invention relates to a mechanism and to a process for removing floating material from a body of liquid. In one form it is embodied in a skimming mechanism adapted to collect and to discharge scum and other floating matter from the surface of a body of liquid.

The mechanism and the process of the present invention have for one object to provide a general conveying mechanism for moving scum and other floating material generally toward a point of scum discharge. They have for another object to provide in addition to the general conveying mechanism a special skimming or scum removing mechanism for moving the scum from the body of liquid and for causing it to be removed positively from the liquid and discharged positively into a scum trough or other scum removing vessel. Another object is to provide two such skimming mechanisms, that is, the main conveying mechanism and the special or final and positive skimmer and to drive them by a single drive. Another object is to drive two such conveyors by providing a positive drive for one and by causing the other to engage the first and to be driven by it, either continuously or interruptedly.

While the process and the mechanism are illustrated herewith in a generally rectangular and relatively longitudinally extended tank, they may be applied to a tank of any shape and the positive or final scum collector might be associated with a main conveyor of almost any other type. The two might be associated together in a circular or rounded tank in which the main conveyor in addition to moving about its axis of rotation is also bodily swung or rotated about the tank. Therefore the present invention is not limited to the association of conveyors shown with any particular form of tank and while it is one of the objects to drive the final scum conveyor or collector from the main collector a separate drive might be provided for the former.

The invention is illustrated more or less diagrammatically in the accompanying drawings, wherein—

Figures 1 and 2 are longitudinal vertical sectional views;

Figure 3 is a partial plan view showing the drive end of the tank;

Figure 4 is a transverse vertical section taken at line 4—4 of Figure 1;

Figure 5 is a partial plan view showing the scum discharge end of the tank;

Figure 6 is a transverse, generally vertical section taken at line 6—6 of Figure 1.

Like parts are designated by like characters throughout the specification and drawings.

In the form shown, the tank is formed of two generally parallel and substantially elongated chambers 1, 1. Side walls 2 are provided and a floor or bottom wall 3, as well as end walls 4 and 5. A central partition 6 separates the compartments 1, 1. At one end a number of sludge hoppers 7, 7 are provided. In the particular form of the invention here shown, there are two such hoppers in each of the chambers 1 and as a means for removing sludge from these hoppers each of them is provided with an outlet 8 controlled by a valve 9 and arranged to discharge through a pipe 10. The pipes 10 may communicate with the final sludge withdrawal pipes 11 or may be arranged in any other suitable manner for carrying out and withdrawing the sludge. Pumps, not here shown, will ordinarily be used to withdraw the sludge through the connections indicated from the hoppers.

The end wall 4 is arranged to provide for the introduction of the influent material. 12 is an influent pipe through which material to be introduced into the tank is brought to the tank. It communicates with a passage 13 of any desired shape, formed in the end wall 4. This passage branches as at 14 into the two final influent conduits 15, 15 which open into the tank chambers through one or more openings 16 which may be of any desired size and shape. Stop plates 17, 17 are positioned in the influent conduits 15 and may be used to control and to regulate the flow of influent to them. Positioned within the tank chambers and generally opposite the influent openings 16 are baffles 18 which serve to break up the current of inflowing material to prevent the formation of rapidly moving currents and to some degree to act as diffusers.

At the opposite end of the tank from that just described, in the end wall 5, is formed an effluent channel 19. This may extend clear across the tank spanning both chambers 1, 1, as shown in Figure 5 or separate effluent channels may be provided, one for each chamber. Where there is a single channel a single discharge 20 is sufficient to remove the effluent from the channel. Along the edge of the effluent channel 19 an adjustable weir 21 may be positioned. By means of adjustment of the weir the maximum height of liquid within the tank can be controlled.

Positioned across each of the chambers 1 adjacent the end wall 5 and preferably adjacent the effluent channels just described, is a scum trough 22. As shown particularly in Figure 1 the open edge 23 of the scum trough is positioned somewhat above the level of fluid within the tank so that the fluid will not of itself flow or discharge into the scum trough. Mechanical means to be described below are necessary to effect the removal of scum from the tank. The scum trough is provided with an inclined surface 24, inclined from the raised edge 23 downwardly into the tank. The conveying means, when used, moves the scum upwardly across the inclined surface 24 and discharges it into the scum trough, from which it is removed through a scum withdrawal pipe 25.

Means are provided in the tank for conveying sludge toward and into the sludge hoppers 7 and means are also provided for conveying scum in an opposite direction toward the scum trough. These means will now be described. In general, in the form of the invention shown herewith, one conveyor acts both as a sludge conveyor and as a scum collector. The upper run of the conveyor acts as a scum collector and the lower run acts as a sludge conveyor or collector.

In general the conveying mechanism comprises two endless chains and a plurality of flights fastened to each chain and extending across between them with the necessary supporting and driving means for the chains. As shown particularly in Figure 3, the driving means comprises two head shafts 26, one for each chamber 1. The shafts are mounted at one end in bearings 27 supported in the side walls 2 of the tank, and at their other ends in bearings 28 carried in yokes or brackets 29. On each of the shafts is mounted a pair of driving sprockets 30 and at its inner ends, adjacent the yokes 29, each of the shafts carries a main sprocket 31 by means of which the shaft itself is driven.

Positioned generally below the head shafts 26 and adjacent the bottom of the tank are turn shafts 32 carried in suitable bearings 33 and each carrying a sprocket 34. Adjacent the opposite end of the tank, toward the bottom, are turn shafts 35 positioned in suitable bearings 36 and each carrying sprockets 37. Generally above the turn shafts 35 and located on the same lever as the head shafts 26 are take-up shafts 38. These carry sprockets 39 and are carried in take-up bearings 40 by means of which they may be adjusted to make the necessary adjustments in the tension of the chains.

While almost any suitable means may be provided for driving the conveyors and while the conveyors of both chambers may be driven by a single drive so as to be driven in unison, for some purposes it is preferable to provide separate driving means for the conveyors of each chamber and such an arrangement has been shown herewith. Thus for the conveyor of each chamber a motor 41 is provided driving a reduction gear 42 by any suitable means. Each of the reduction gears carries a driving sprocket 43 which, by means of a chain 44, engages one of the driving sprockets 31 on one of the head shafts 26 to rotate it and thus each motor drives the conveyor in one of the chambers and the conveyors may thus be separately driven and separately controlled.

The main conveyor, which is driven by means thus far described, includes a pair of endless chains 45 and flights 46, which extend across between and are attached to pairs of chains, as shown in detail in Figure 6. The flights carry, in one face, wearing plates or members 47 which may be merely wear plates or might be rollers or other friction reducing members, and in the opposite face they carry members 48 which may be rollers or wearing plates. The rollers or wearing plates 48 contact tracks 49 supported on the inner surface of the side walls of the tank adjacent the upper level of the fluid within the tank on suitable supports 50.

Adjacent the scum trough is provided a scum collector which is driven by the main conveyor just described and which carries the scum to the scum trough, carries it up over the inclined surface 24 and deposits it in the trough 22. This conveyor is shown in vertical section at the right hand end of Figure 2, adjacent the scum trough and is shown in plan in Figure 5. In the form shown the scum collector comprises bearing supports 51 secured to the inner faces of the walls of the tank. Each of the supports furnishes a bearing for a sprocket 52 about which an endless chain 53 runs. Flights 54 extend between each pair of chains. The flights may be of any suitable design but ordinarily will include a wiping element or portion 55 of such size that as the scum collector passes over the inclined surface 24 leading up to the scum trough that surface will be swept by some part of the flight so that scum will not merely be conveyed into the trough but so that the inclined surface will be squeegeed or swept clean. For this purpose the flight may carry a rubber or other slightly flexible member. The scum collector is preferably not provided with any driving means of its own but is driven by the main conveyor, the flights of the latter contacting the cams of the scum collector and so moving the scum collector forward. The relative positioning of the flights on the main conveyor and the cams of the scum collector may be such that a scum collector cam is constantly engaged by a conveyor flight so that the scum collector is constantly in motion or they may be so arranged that the scum collector is moved periodically and remains stationary periodically so that it may have either a continuous or an interrupted movement. In order that the scum collector may run generally parallel to the surface 24, idler sprockets 56 carried by bearing supports 57 are provided as shown in Figure 2. The chains 53 may be provided with cams or pusher elements 58. It is these elements rather than the flights of the scum collector that are contacted by the flights of the main conveyor.

I claim:

1. In a sedimentation chamber, a sludge conveyor, a scum trough, a scum conveyor, each conveyor having flights, means for driving the sludge conveyor, the flights thereon adapted to engage and drive the scum conveyor.

2. In a sedimentation chamber, a conveyor, means for driving it to cause it to convey sludge on its lower run and scum on its upper run, a scum trough, the upper run terminating short of the scum trough, a scum conveyor extending from the terminus of the upper run of the sludge conveyor and discharging into said trough, and means on said first mentioned conveyor engaging and driving said scum conveyor.

3. In a sedimentation chamber, a scum trough, a main conveyor extending throughout the chamber adapted to convey sludge on its lower run and scum on its upper run, said scum trough in line with the scum run of the conveyor and additional means for conveying scum from the end of the scum run of the conveyor to the scum trough, the scum conveyor and the main conveyor being arranged in interlocking relation whereby the scum conveyor picks up and positively takes control of the scum before it leaves the main conveyor.

4. In a sedimentation chamber, a scum trough, a main conveyor extending throughout the chamber adapted to convey sludge on its lower run and scum on its upper run, said scum trough in line with the scum run of the conveyor and additional means for conveying scum from the end of the scum run of the conveyor to the scum trough, said means comprising a scum conveyor adapted to be driven from the sludge conveyor, the scum conveyor and the main conveyor being arranged in interlocking relation whereby the scum conveyor picks up and positively takes control of the scum before it leaves the main conveyor.

5. In a sedimentation chamber, a scum trough, a main conveyor extending throughout the chamber adapted to convey sludge on its lower run and scum on its upper run, said scum trough in line with the scum run of the conveyor and additional means within the chamber for conveying scum from the end of the scum run of the conveyor to the scum trough, the scum trough being located above the liquid level of the tank, an inclined plane extending from below the liquid level of the tank, to the scum trough, the scum conveyor being adapted to travel upwardly along an inclined plane, the scum conveyor and the main conveyor being arranged in interlocking relation whereby the scum conveyor picks up and positively takes control of the scum before it leaves the main conveyor.

6. In a sedimentation chamber, a scum trough, a main scum skimming conveyor adapted to continuously propel scum toward and terminating short of the trough, an auxiliary scum conveyor within said chamber in interlocking relationship with the main conveyor and adapted to receive the scum before it leaves the influence of the main conveyor and propel it toward and into the trough.

7. In a sedimentation chamber, a scum trough, a main scum skimming conveyor adapted to continuously propel scum toward and terminating short of the trough, an auxiliary scum conveyor in interlocking relationship with the main conveyor and adapted to receive the scum before it leaves the influence of the main conveyor and propel it toward and into the trough, the auxiliary conveyor extending over the trough.

8. In combination in a settling tank, a scum trough, a main scum conveyor having flights projecting upwardly through and means below the surface of the liquid in the tank for moving them toward the scum trough, an auxiliary scum conveyor having flights projecting downwardly into the path of said main scum conveyor flights and through the surface of the liquid, and means located above the surface of the liquid for propelling them in the direction of the scum trough.

9. In combination in a settling tank, a scum trough, a main scum conveyor having flights projecting upwardly through and means below the surface of the liquid in the tank for moving them toward the scum trough, an auxiliary scum conveyor having flights projecting downwardly through, and means located above the surface of the liquid for propelling them in the direction of the scum trough, the conveyors being arranged in overlapping relationship whereby the flights on the auxiliary conveyor take control of the scum propelled by the flights on the main conveyor as the scum leaves the zone of influence of the main conveyor.

10. In combination in a settling tank, a scum trough, a main scum conveyor having flights projecting upwardly through, and means below the surface of the liquid in the tank for moving them toward the scum trough, an auxiliary scum conveyor having flights projecting downwardly into the path of said main scum conveyor flights and through the surface of the liquid, and means located above the surface of the liquid for propelling them in the direction of the scum trough, the auxiliary conveyor extending over the trough.

11. In combination, a sedimentation chamber, a scum trough, a continuously forwardly moving main scum conveyor adapted to propel scum toward the trough in a generally straight line, the conveyor terminating short of the trough, an auxiliary scum conveyor adapted to receive the scum from the main conveyor and to propel it continuously toward and into the trough, the relationship between the two conveyors and their rate of travel being such that the scum received from the main conveyor is propelled forwardly by the auxiliary conveyor at the same rate of speed whereby the scum moves without interruption across the entire tank to the trough.

12. In a settling tank and the like which is provided with traveling means including a plurality of spaced elements for moving the settled sludge therein, the combination of a scummer member mounted for rectilinear movement along the surface of the liquid in the tank; and means intermittently engageable by successive elements of said sludge-moving means, for imparting movement to said scummer member.

13. In a sedimentation chamber, a main conveyor extending throughout the chamber adapted to convey sludge on its lower run and scum on its upper run, a scum trough in line with the scum run of the conveyor and additional means for conveying scum from the end of the scum run of the conveyor to the scum trough, said means comprising a scum conveyor adapted to be driven by the sludge conveyor, the scum trough being located above the liquid level of the tank, an inclined plane extending from below the liquid level of the tank to the scum trough, the scum conveyor being adapted to travel upwardly along an inclined plane, the scum conveyor and the main conveyor being arranged in interlocking relation whereby the scum conveyor picks up and positively takes control of the scum before it leaves the main conveyor.

14. In a sedimentation chamber, a sludge conveyor, a scum trough, a scum conveyor, each conveyor having flights, means for driving the sludge conveyor, the flights thereon adapted to engage and drive the scum conveyor, and contact members on said scum conveyor adapted to be contacted by the flights of said sludge conveyor.

15. In a sedimentation chamber, a sludge conveyor, a scum trough, having a downwardly inclined surface, pointing in the direction of said sludge conveyor, a scum conveyor, each conveyor having flights, means for driving the sludge conveyor, parts of the sludge conveyor adapted to contact parts of the scum conveyor to cause the latter to move, the scum conveyor arranged to move partially along a path generally parallel to that of the sludge conveyor and partially along a path generally parallel to the plane of said inclined surface.

16. In combination in a settling tank, a scum trough, a main scum conveyor having flights projecting upwardly through the surface of the liquid in the tank and means below the surface of the liquid in the tank for moving said main scum conveyor toward the scum trough, an auxiliary scum conveyor having flights projecting downwardly through the surface of the liquid in the tank and means located above the surface of the liquid for propelling said auxiliary scum conveyor in the direction of the scum trough, the conveyors being arranged in overlapping relationship whereby the flights on the auxiliary conveyor take control of the scum propelled by the flights on the main conveyor as the scum leaves the zone of influence of the main conveyor.

17. In a settling tank and the like, having means for moving the settled sludge therein, and a scum receptacle, the combination of endless belts mounted in the tank adjacent said receptacle; a scummer member carried by said belts; and driving means carried by said belts, arranged to be engaged by elements of said sludge-moving means, whereby said scummer member may be moved to and from said receptacle.

18. In a settling tank and the like, having means including a plurality of traveling conveyor flights for moving the settled sludge therein, and a scum receptacle, the combination of endless belts mounted in the tank adjacent said receptacle; a scummer member carried by said belts; and a plurality of power-transmitting members carried by said belts arranged to be engaged by successive sludge-moving flights, whereby said scummer member may be moved to and from said receptacle.

19. In a sedimentation tank and the like provided with traveling means for moving the settled sludge therein, and a scum receptacle, the combination of a scummer member mounted independently of said sludge-moving means for horizontal movements to and from said receptacle; and means connected with said scummer member positioned in the path of a portion of said sludge moving means for engagement thereby to cause said scummer member to move matter floating on the surface of the liquid in the tank into said scum receptacle.

20. In a settling tank and the like provided with a scum receptacle and traveling sludge-moving means arranged to also move floating matter part-way toward said receptacle, the combination of an additional scum-moving member mounted for longitudinal movement along the surface of the liquid, and arranged to move said floating matter the balance of the distance to said receptacle; and means engageable by a portion of said sludge moving means for imparting movement to said additional scum-moving member.

21. In sewage apparatus, the combination with a settling tank, of conveying mechanism in said tank having its lower flight adjacent said tank bottom and its upper flight adjacent the tank top at the level of the sewage therein, means for driving said conveying mechanism to scrape settled material to one end and convey floating material to the other end, a scum trough at said other end, and additional conveying mechanism having the same plane of movement as said first named conveying mechanism and constructed and arranged to overlap said first named conveying mechanism and to convey floating material to said scum trough, said conveyors being operated in unison.

22. In sewage apparatus, the combination with a settling tank, of conveying mechanism in said tank having its lower flight adjacent said tank bottom and its upper flight adjacent the tank top at the level of the sewage therein, means for driving said conveying mechanism to scrape settled material to the influent end and convey floating material to the effluent end, a scum trough at said effluent end, and additional conveying mechanism having the same plane of movement as said first named conveying mechanism and constructed and arranged to overlap said first named conveying mechanism and to convey floating material to said scum trough, said conveyors being operated in unison.

23. In sewage apparatus, the combination with a tank, of a pair of conveyors in said tank, the upper run of one conveyor and the lower run of the other conveyor being positioned near the normal liquid level in said tank, said conveyors moving on parallel axes and being in overlapping relation, and means for operating said conveyors in interlocked relation.

24. In combination, a settling tank for sewage and the like, a main scum collecting member and an auxiliary scum collecting member, means for guiding both members along a path parallel to the level of the liquid in the tank, said means being adapted to so position the members that they are partially immersed in the liquid, a scum trough in the path of the auxiliary member, a ramp inclined upwardly out of the water to the edge of the scum trough, along which the auxiliary member is adapted to travel until it is entirely out of the water and until the scum which it propels is discharged into the trough, the paths of the collecting members overlapping whereby the scum initially collected by the main member is taken under positive control of the auxiliary member before it leaves the area of positive control of the main member and means for moving said members in coordination.

25. In combination, a settling tank for sewage and the like, a main scum collecting member, means for supporting and guiding it along a path parallel with the level of and partially immersed in the liquid in the tank throughout its entire effective scum collecting range, an auxiliary scum collecting member, means for supporting and guiding it along a path parallel with the level of and partially immersed in the liquid of the tank throughout a portion of its effective scum collecting range, a scum trough and an associated ramp in the path of the auxiliary member far removed from the main member, the auxiliary member being adapted to travel up the ramp until it is entirely out of the liquid, to discharge scum carried by it into the trough, the area swept by the main and the auxiliary members overlapping, whereby scum initially collected by the main member comes under the positive control of the auxiliary member before it leaves the positive control of the main member, and means for moving both members in coordination.

MARCUS B. TARK.